(12) United States Patent
Yang et al.

(10) Patent No.: US 10,381,627 B2
(45) Date of Patent: Aug. 13, 2019

(54) BATTERY STRUCTURE AND METHOD OF MANUFACTURING THE SAME

(71) Applicant: Samsung Electronics Co., Ltd., Suwon-si, Gyeonggi-do (KR)

(72) Inventors: Hojung Yang, Suwon-si (KR); Hwiyeol Park, Ansan-si (KR); Jin S. Heo, Hwaseong-si (KR); Kyounghwan Kim, Seoul (KR); Sungjin Lim, Suwon-si (KR); Huisu Jeong, Suwon-si (KR); Junhyeong Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 208 days.

(21) Appl. No.: 15/397,958

(22) Filed: Jan. 4, 2017

(65) Prior Publication Data

US 2018/0013119 A1 Jan. 11, 2018

(30) Foreign Application Priority Data

Jul. 7, 2016 (KR) ........................ 10-2016-0086402

(51) Int. Cl.
*H01M 2/20* (2006.01)
*H01M 4/70* (2006.01)
*H01M 4/72* (2006.01)

(52) U.S. Cl.
CPC .............. *H01M 2/204* (2013.01); *H01M 4/70* (2013.01); *H01M 2/206* (2013.01); *H01M 4/72* (2013.01); *H01M 2220/30* (2013.01)

(58) Field of Classification Search
CPC .... H01M 2/204; H01M 2220/30; H01M 4/70; H01M 4/72
(Continued)

(56) References Cited

U.S. PATENT DOCUMENTS 6,677,078 B2 * 1/2004 Reise ................... H01M 2/105
429/159
8,187,740 B2 5/2012 Nathan et al.
(Continued)

FOREIGN PATENT DOCUMENTS

JP 2002-141101 A 5/2002
KR 1020060026485 A 3/2006
(Continued)

*Primary Examiner* — Jonathan G Jelsma
*Assistant Examiner* — Omar M Kekia
(74) *Attorney, Agent, or Firm* — Cantor Colburn LLP

(57) ABSTRACT

A battery structure including a positive electrode current collector layer; a plurality of battery modules on the positive electrode current collector layer and spaced apart from one another; and a negative electrode current collector layer on the battery modules, opposite to the positive electrode current collector layer, wherein each battery module of the plurality of battery modules includes a plurality of first positive active material layers which are in electrical contact with the positive electrode current collector layer and disposed in a direction protruding from the positive electrode current collector layer; a plurality of first negative active material layers which are in electrical contact with the negative electrode current collector layer and disposed in a direction protruding from the negative electrode current collector layer; and an electrolyte layer between the first positive active material layers and the first negative active material layers.

23 Claims, 13 Drawing Sheets

(58) Field of Classification Search
USPC .......................................................... 429/152
See application file for complete search history.

(56) References Cited

U.S. PATENT DOCUMENTS

| | | | |
|---|---|---|---|
| 8,372,536 B2 | 2/2013 | Han et al. | |
| 2004/0241540 A1 | 12/2004 | Tsutsumi et al. | |
| 2005/0175890 A1 | 8/2005 | Tsutsumi et al. | |
| 2010/0075219 A1* | 3/2010 | Iwaya | H01M 2/14 429/158 |
| 2012/0263995 A1* | 10/2012 | Naito | H01M 2/1077 429/146 |
| 2013/0078513 A1* | 3/2013 | Nathan | H01G 11/06 429/211 |
| 2014/0099539 A1* | 4/2014 | Yamazaki | H01M 4/386 429/211 |
| 2014/0162141 A1* | 6/2014 | Fujiki | H01M 4/131 429/322 |
| 2014/0242428 A1* | 8/2014 | Walker | B60K 1/04 429/61 |
| 2016/0204464 A1 | 7/2016 | Cho et al. | |
| 2016/0204477 A1 | 7/2016 | Yang et al. | |
| 2017/0104235 A1 | 4/2017 | Cho et al. | |

FOREIGN PATENT DOCUMENTS

| | | |
|---|---|---|
| KR | 1020110005595 A | 1/2011 |
| KR | 1020160085624 A | 7/2016 |
| KR | 1020160086716 A | 7/2016 |
| KR | 1020160088126 A | 7/2016 |
| KR | 1020170042935 A | 4/2017 |

* cited by examiner

BATTERY STRUCTURE AND METHOD OF MANUFACTURING THE SAME

CROSS-REFERENCE TO RELATED APPLICATION

This application claims priority to and the benefit of Korean Patent Application No. 10-2016-0086402, filed on Jul. 7, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a battery structure, and a method of manufacturing the same.

2. Description of the Related Art

As technology in the electronics field has developed, the market for various portable and wearable electronic devices such as cellular phones, game devices, portable multimedia players (PMP), MPEG audio layer-3 (MP3) players, smartphones, smart pads, e-readers, tablet computers, and mobile medical devices, has grown. Accordingly, with an increase in the demand for portable electronic devices, demand for batteries appropriate for powering portable electronic devices has also increased.

Secondary batteries refer to batteries capable of charging and discharging, whereas primary batteries are not rechargeable. As a secondary battery, a lithium battery has a higher voltage and a higher energy density per unit weight than a nickel-cadmium battery or a nickel-hydrogen battery. There remains a need for improved electrodes for batteries.

Although secondary batteries including three-dimensional electrodes provide a large capacity, the secondary battery may not operate due to cracks or the like which are generated during charging and discharging of the battery. Thus, the majority of the capacity of the secondary battery may decrease.

Therefore, there is a demand for secondary batteries having a large capacity that does not decrease even in the case of deterioration of the secondary batteries.

SUMMARY

Provided is a battery structure that includes a plurality of battery modules that are electrically connected to and ionically blocked from one another.

Provided is a method of manufacturing the battery structure.

According to an aspect of an embodiment, a battery structure includes: a positive electrode current collector layer; a plurality of battery modules disposed on the positive electrode current collector layer and spaced apart from one another; and a negative electrode current collector layer disposed on the plurality of battery modules and disposed opposite to the positive electrode current collector layer, wherein each battery module of the plurality of battery module includes: a plurality of first positive active material layers which are in electrical contact with the positive electrode current collector layer and disposed in a direction protruding from the positive electrode current collector layer; a plurality of first negative active material layers which are in electrical contact with the negative electrode current collector layer and disposed in a direction protruding from the negative electrode current collector layer; and an electrolyte layer disposed between the plurality of first positive active material layers and the plurality of first negative active material layers.

According to an aspect of another embodiment, a method of manufacturing the battery structure includes: preparing a positive active material layer module; disposing a plurality of positive active material layer modules on a positive electrode current collector layer so as to be spaced apart from one another; disposing an electrolyte layer on the plurality of positive active material layer modules; disposing a negative active material layer on the electrolyte layer; and disposing a negative electrode current collector layer on the negative active material layer, wherein the positive active material layer module includes a plurality of positive active material layers disposed perpendicular to a surface of the positive electrode current collector layer.

According to an aspect of yet another embodiment, a method of manufacturing the battery structure includes: providing a positive active material layer module; disposing the positive active material layer module on a conductive substrate; disposing an electrolyte layer on the positive active material layer module; disposing a negative active material layer on the electrolyte layer to prepare a battery module; disposing a plurality of battery modules on a positive electrode current collector layer to be spaced apart from one another; and disposing a negative electrode current collector layer on the plurality of battery modules, wherein the positive active material layer module comprises a plurality of positive active material layers disposed perpendicular to a surface of the positive electrode current collector layer.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
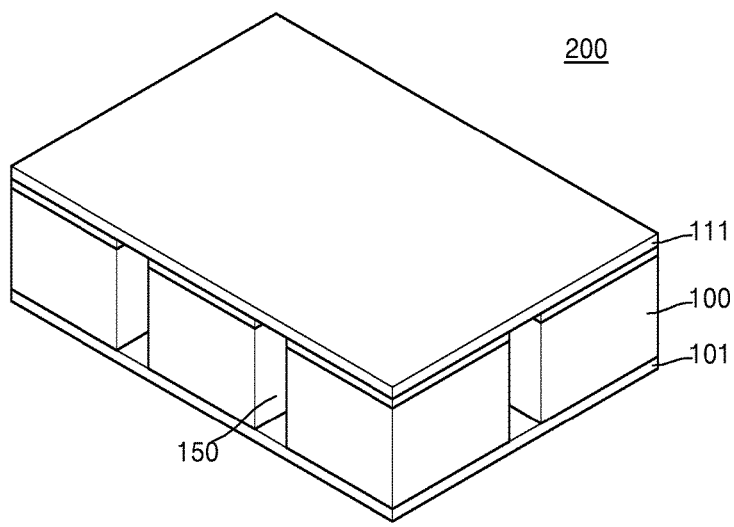
FIG. 1 illustrates a perspective view of a structure of an embodiment of a battery structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the present specification, the term "battery" indicates a primary battery or a secondary battery. The battery may be an electrochemical battery, for example, a lithium secondary battery or a sodium secondary battery.

Like reference numerals in the drawings denotes like components, and sizes of components in the drawings may be exaggerated for clarity and convenience of explanation. In addition, embodiments described herein are illustrative purposes only, and various changes in form and details may be made therein. It will be understood that when a component is referred to as being "on the top of" or "on" another component, the component can be directly on the other component or indirectly thereon. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, with reference to the attached drawings, embodiments of a battery structure and a method of preparing the battery structure will be described in further details.

Figure 2:
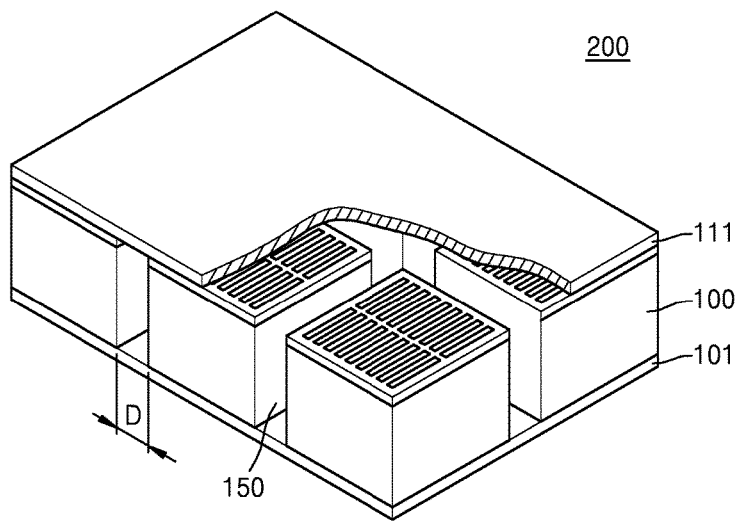
FIG. 2 illustrates a partial perspective view showing a battery module included in the battery structure illustrated in FIG. 1.
Figure 3:
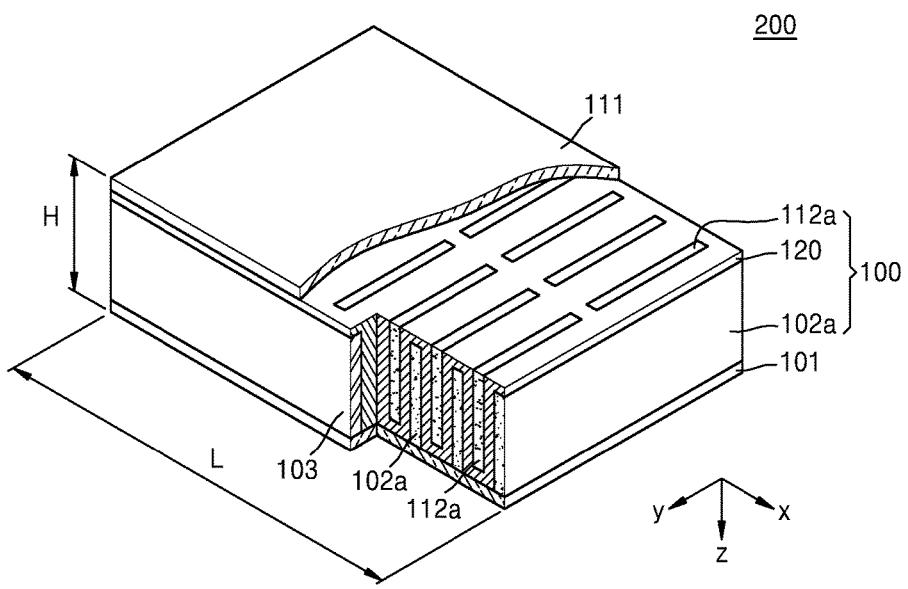
FIG. 3 illustrates a perspective view of a battery module included in the battery structure illustrated in FIG. 2, of which an upper portion and a side surface are partially exposed.
Figure 4:
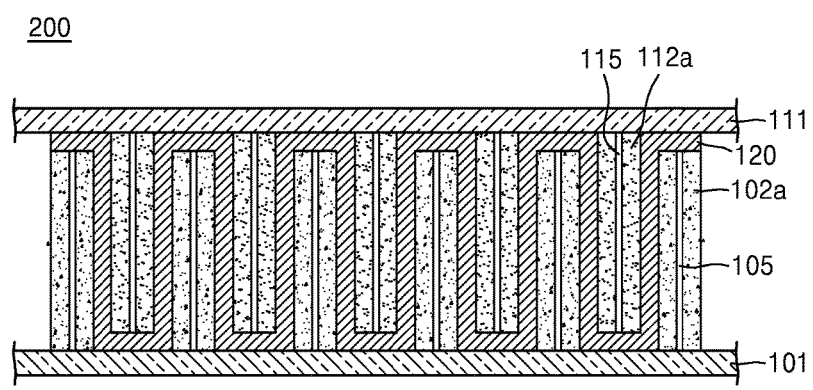
FIG. 4 illustrates a cross-sectional view of the battery module shown in the battery structure illustrated in FIG. 2.

FIG. 1 illustrates a perspective view of a battery structure 200 according to embodiment. FIG. 2 illustrates a partial perspective view showing a battery module 100 which is included in the battery structure 200 illustrated in FIG. 1. FIG. 3 illustrates an enlarged view of the battery module 100 of which an upper portion and a side surface are partially exposed, the battery module 100 being selected from a plurality of battery modules 100 included in the battery structure 200 illustrated in FIG. 2. FIG. 4 illustrates a cross-sectional view of the battery module 100 selected from the plurality of battery modules 100 included in the battery structure 200 illustrated in FIG. 2.

Referring to FIGS. 1 to 4, the battery structure 200 according to one or more embodiments may include a positive electrode current collector layer 101, a plurality of battery modules 100 disposed on the positive electrode current collector layer 101 and spaced apart from one another, and a negative electrode current collector layer 111 disposed on the plurality of battery modules 100 and disposed opposite to the positive electrode current collector layer 101. The battery module 100 may include a plurality of first positive active material layers 102a that may be in electrical contact with the positive electrode current collector layer 101 and which are disposed in a direction protruding from the positive electrode current collector layer 101. The battery structure 200 also includes a plurality of first negative active material layers 112a that may be in electrical contact with the negative electrode current collector layer 111 and which are disposed in a direction protruding from the negative electrode current collector layer 111, and an electrolyte layer 120 disposed between the plurality of first positive active material layers 102a and the plurality of first negative active material layers 112a.

In the battery structure 200, the plurality of battery modules 100 that are spaced apart from one another may be in electrical contact (e.g., electrically connected) with one another by at least one selected from the positive electrode current collector layer 101 and the negative electrode current collector layer 111. The positive electrode current collector layer 101 and the negative electrode current collector layer 111 may include, for example, at least one electrically conductive metal, such as copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), and palladium (Pd). However, embodiments are not limited thereto, and any suitable current collector may be used. The positive electrode current collector layer 101 may be, for example, an aluminum foil. The negative electrode current collector layer 111 may be, for example, a copper foil.

The plurality of battery modules 100 in the battery structure 200 may be spaced apart from one another, and thus the plurality of battery modules 100 may be ionically blocked from one another. The battery structure 200 may include an ion non-conductive gas or ion non-conductive solid between the plurality of battery modules 100. That is, in the battery structure 200, an ion non-conductive layer 150 may be disposed between each battery module of the plurality of battery modules 100, and thus the plurality of battery modules 100 are ionically blocked from one another. In addition, the ion non-conductive layer 150 may include an ion non-conductive gas or an ion non-conductive solid. Examples of the ion non-conductive gas may include air, nitrogen, argon, and helium, but embodiments are not limited thereto. Any suitable gas that prevents ion transfer available may be used. Examples of the ion non-conductive layer solid may be a polymer, but embodiments are not limited thereto. Any suitable solid that prevents ion transfer may be used. The ion non-conductive solid may serve as a supportive material for improving structural stability of the battery structure 200. For example, the ion non-conductive layer 150 may include at least one polymer having significantly low ionic conductivity in order to prevent ion transfer, such as an epoxy resin, polytetrafluoroethylene (PTFE), and polyethylene terephthalate (PET). The ionic conductivity of the ion non-conductive layer 150 may be $1 \times 10^{-7}$ siemens per centimeter (S/cm) or less. For example, the ionic conductivity of the ion non-conductive layer 150 may be $1 \times 10^{-7}$ S/cm or less at a temperature of about 25° C. For example, the ionic conductivity of the ion non-conductive layer 150 may be $1 \times 10^{-10}$ S/cm or less at a temperature of about 25° C. For example, the ionic conductivity of the ion non-conductive layer 150 may be $1 \times 10^{-15}$ S/cm or less at a temperature of about 25° C. For example, the ionic conductivity of the ion non-conductive layer 150 may be $1 \times 10^{-20}$ S/cm or less at a temperature of about 25° C.

In the battery structure 200, the ion non-conductive layer 150 disposed between each of the battery modules of the plurality of battery modules 100 may be connected to one another to form an ion non-conductive channel.

Although the plurality of battery modules 100 in the battery structure 200 may be electrically connected to one another, the plurality of battery modules 100 may be ionically blocked from one another. Thus, even when some of the plurality of battery modules 100 do not operate due to deterioration, the failed battery modules 100 do not affect charging and discharging of the other battery modules 100. Therefore, a decrease of capacity of the battery structure 200 may be reduced, thus efficiently maintaining capacity thereof.

The battery module 100 may be deteriorated due to various reasons. When the battery module 100 is deteriorated, the electrical conductivity of the failed battery module 100 may be $10^{-8}$ S/cm or less. For example, the electrical conductivity of the failed battery module 100 may be $10^{-10}$ S/cm or less. For example, a decrease of electrical conductivity of the battery module 100 may result from formation of a leak between the electrolyte layer 120 and a negative active material layer 112, followed by enlargement of a void, which is an area that may not be in contact with the electrolyte layer 120 and the negative active material layer 112 and which occurs at an interface between the electrolyte layer 120 and the negative active material layer 112 toward the inside of the negative active material layer 112.

Figure 10A:
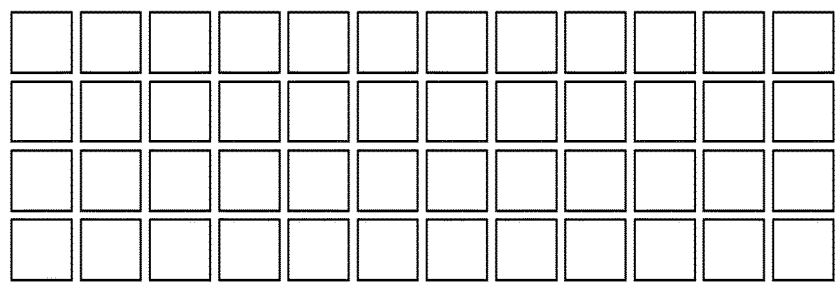
FIG. 10A illustrates a plan view of a battery structure including 48 battery modules.
Figure 10B:
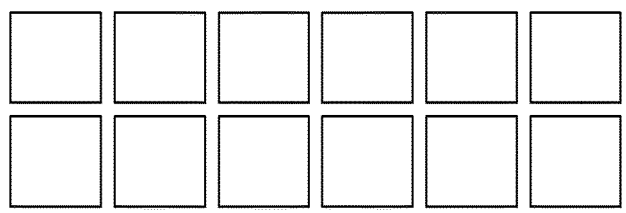
FIG. 10B illustrates a plan view of a battery structure having the same area as illustrated in FIG. 10A and including 12 battery modules.
Figure 10C:
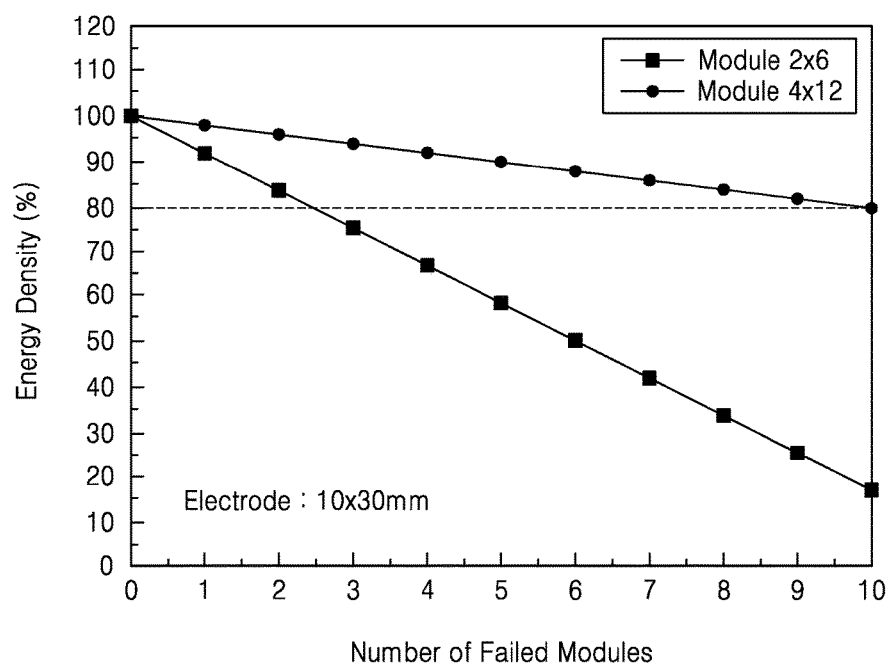
FIG. 10C is a graph of energy density (percent, %) versus number of failed modules, illustrating the changes in energy density depending on the number of failed modules in the battery structures illustrated in FIGS. 10A and 10B.

Referring to FIGS. 10A and 10B, FIG. 10A illustrates a schematic view of the battery structure 200 including 48 battery modules 100, and FIG. 10B illustrates a schematic view of the battery structure 200 including 12 battery modules 100, wherein an area of the battery structure 200 illustrated in FIG. 10B is the same as that of the battery structure 200 illustrated in FIG. 10A. FIG. 10C is a graph that illustrates the rate of decrease in energy density versus the number of failed battery modules 100 in the battery structure 200. As shown in FIG. 10C, when the number of battery modules 100 included in the battery structure 200 increases, for example, from 12 (Module 2×6) to 48 (Module 4×12), a decrease in the energy density of the whole battery structure 200, due to deterioration of the battery modules 100, may further be suppressed.

The number of battery modules 100 included in the battery structure 200 is not particularly limited, and may be chosen depending on the environment or the size of a device that includes the battery structure 200. For example, the number of battery modules 100 included in the battery structure 200 may be 2 or greater, 5 or greater, 10 or greater, 50 or greater, 100 or greater, 500 or greater, 1000 or greater, or 5000 or greater. The shape of the battery structure 200 is not particularly limited, and may be chosen depending on the size or the shape of the space in which the battery structure 200 is accommodated. For example, the battery structure 200 may be rectangular, square, circular, elliptical, pentagonal, hexagonal, or heptagonal. In addition, in the battery structure 200, the plurality of battery modules 100 may be spaced apart from one another, but remain electrically connected to one another via a flexible and conductive metal. Thus, even if the battery structure 200 is curved or bent, the formation of cracks in each battery module 100 may be prevented, and the battery structure 200 may be in curved-surface form, not in flat-surface form.

Referring to FIG. 2, in the battery structure 200, a distance D (or interval) between the plurality of battery modules 100 may be in a range of about 0.01 millimeters (mm) to about 1 mm. For example, the distance D between adjacent battery modules 100 may be in a range of about 0.02 mm to about 1 mm. For example, the distance D between adjacent battery modules 100 may be in a range of about 0.05 mm to about 1 mm. For example, the distance D between adjacent battery modules 100 may be in a range of about 0.1 mm to about 1 mm. For example, the distance D between adjacent battery modules 100 may be in a range of about 0.2 mm to about 1 mm. When the distance D between the plurality of battery modules 100 is excessively short (e.g., less than about 0.01 mm), it may be difficult to prevent ions from migrating between adjacent battery modules 100, whereas, when the distance D between the plurality of battery modules 100 is excessively long (e.g., greater than about 1 mm), an electrochemically inactive area may excessively increase, thereby lowering the capacity and energy density of the battery structure 200.

In the battery structure 200, a distance between a side surface and an opposite side surface of the battery module 100 may be in a range of about 1 mm to about 5 cm. For example, a length L in FIG. 3 of another side surface of the battery module 100 which corresponds to a distance between a side surface and an opposite side surface of the battery module 100, may be in a range of about 1 mm to about 5 cm. For example, the distance between a side surface and an opposite side surface of the battery module 100 may be in a range of about 2 mm to about 5 cm. For example, the distance between a side surface and an opposite side surface of the battery module 100 may be in a range of about 5 mm to about 5 cm. For example, the distance between a side surface and an opposite side surface of the battery module 100 may be in a range of about 1 cm to about 5 cm. For example, the distance between a side surface and an opposite side surface of the battery module 100 may be in a range of about 2 cm to about 5 cm. When the distance between a side surface and an opposite side surface of the battery module 100 is excessively short (e.g., less than about 1 mm), the size of the battery module 100 may be small, resulting in low workability, whereas, when the distance between a side surface and an opposite side surface of the battery module 100 is excessively long (e.g., greater than about 5 cm), the size of the battery module 100 may be excessively large, resulting in reduction of a deterioration-suppressing effect of the battery structure 200.

Referring to FIG. 3, in the battery structure 200, a height H of the battery module 100 may be in a range of about 10 (micrometers) μm to about 5 mm. For example, the height H of the battery module 100 may be in a range of about 10 μm to about 1 mm. For example, the height H of the battery module 100 may be in a range of about 50 μm to about 1 mm. For example, the height H of the battery module 100 may be in a range of about 100 μm to about 500 μm. For example, the height H of the battery module 100 may be in a range of about 100 μm to about 400 μm. For example, the height H of the battery module 100 may be in a range of about 100 μm to about 300 μm. When the height H of the battery module 100 is excessively low (e.g., less than about 10 μm), energy density of the battery structure 200 may decrease, whereas when the height H of the battery module 100 is excessively high (e.g., greater than about 5 mm), structural stability of the battery structure 200 may decrease.

Referring to FIG. 3, the battery module 100 may include at least one partition 103 that may be in contact with each of the plurality of first positive active material layers 102a and may be disposed perpendicular to each of the plurality of first positive active material layers 102a. For example, referring to FIG. 3, the partition 103 may be in contact with each of the plurality of first positive active material layers 102a that are disposed in a y-direction which is perpendicular to the partition 103 disposed in an x-direction. Referring to FIG. 3, in the battery module 100, the partition 103 may be disposed on a side surface, an opposite side surface, and a middle portion, i.e., the midpoint between the side surface and the opposite side surface, of the battery module 100. However, the partition 103 disposed on the opposite side surface and/or the partition 103 disposed on the middle portion may be sheathed with the electrolyte layer 120, which is not illustrated in FIG. 3. The partition 103 may be disposed perpendicular to the plurality of first positive active material layers 102a to support a side surface thereof. Thus, when charging and discharging a battery, deformation of the battery module 100 due to swelling and/or shrinking of the first positive active material layer 102a may be suppressed, thereby preventing deterioration of the battery module 100. Therefore, when the battery module 100 includes the partition 103, the lifespan thereof may improve.

The partition 103 may have a composition which is different from the composition of the first positive active material layer 102a. When the partition 103 has a composition different from that of the first positive active material layer 102a, the partition 103 may support the first positive active material layer 102a more firmly. For example, the partition 103 may have a composition which may be inactive against electrochemical reactions. Since the partition 103 is inactive against electrochemical reactions, when charging and discharging the battery structure 200, changes in volume of one first positive active material layer 102a may not affect the other first positive active material layers 102a, thus improving stability of the plurality of first positive active material layers 102a.

The partition 103 may have a composition which is the same as that of the first positive active material layer 102a. When the partition 103 has a composition the same as that of the first positive active material layer 102a, compared to a battery structure without a partition, the volume of the positive active material may increase, thus additionally increasing energy density of the battery structure 200.

Figure 5:
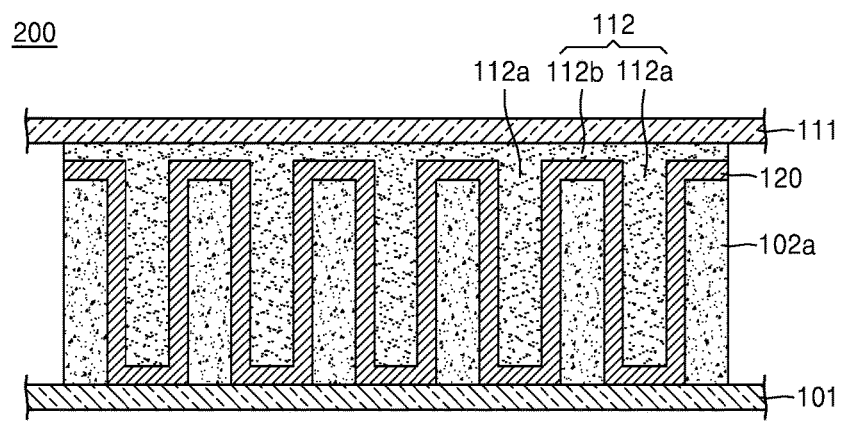
FIG. 5 illustrates a cross-sectional view of another embodiment of a battery module.
Figure 6:
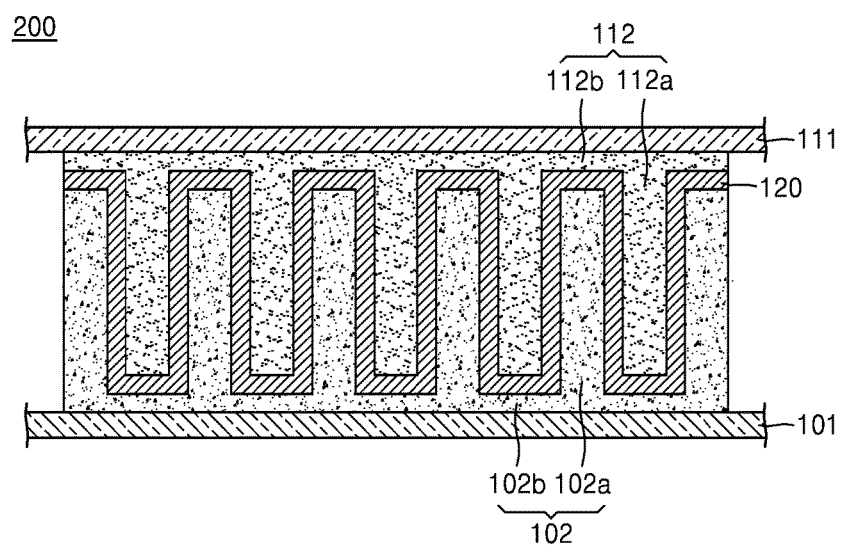
FIG. 6 illustrates a cross-sectional view of still another embodiment of a battery module.

Referring to FIGS. 5 and 6, the battery module 100 may further include a plurality of second negative active material layers 112b that are in contact with the negative electrode current collector layer 111 and disposed between the plurality of first negative active material layers 112a, and which connect the plurality of first negative active material layers 112a. Upon comparing FIG. 4 with FIG. 5, it can be seen that in FIG. 4, the electrolyte layer 120, in contact with the negative electrode current collector layer 111, is disposed between the plurality of first negative active material layers 112a, while, in FIG. 5, the plurality of second negative active material layers 112b, in contact with the negative electrode current collector layer 111, may be further included between the plurality of first negative active material layers 112a. The first negative active material layer 112a and the second negative active material layer 112b may be formed as one body to constitute the negative active material layer 112.

Referring to FIG. 6, the battery module 100 may further include a plurality of second positive active material layers 102b that are in contact with the positive electrode current collector layer 101 and disposed between the plurality of first positive active material layers 102a, and which connect the plurality of first positive active material layers 102a. Upon comparing FIG. 4 with FIG. 6, in FIG. 4, it can be seen that the electrolyte layer 120 in contact with the positive electrode current collector layer 101 is disposed between the plurality of first positive active material layers 102*a*, while, in FIG. 6, the plurality of second positive active material layers 102*b* that are in contact with the negative electrode current collector layer 101 may be further included between the plurality of first negative active material layers 102*a*. The first positive active material layer 102*a* and the second positive active material layer 102*b* may be formed as one body to constitute a positive active material layer 102.

Referring to FIGS. 4 to 7, although not illustrated therein, a conductive adhesive layer may be disposed between the plurality of first positive active material layers 102*a* and the positive electrode current collector layer 101. The conductive adhesive layer may adhere the first positive active material layer 102*a* to the positive electrode current collector layer 101 such that the first positive active material layer 102*a* is electrically connected to the positive electrode current collector layer 101. The conductive adhesive layer may be formed using a conductive adhesive or a conductive paste.

Referring to FIGS. 1 to 7, in the battery structure 200, the positive electrode current collector layer 101 and the negative electrode current collector layer 111 may be disposed parallel to and spaced apart from each other. The positive electrode current collector layer 101 and the negative electrode current collector layer 111 may be in planar form.

Referring to FIGS. 1 to 7, in the battery structure 200, the plurality of first positive active material layers 102*a* and the plurality of first negative active material layers 112*a* may be disposed perpendicular to the positive electrode current collector layer 101 and the negative electrode current collector layer 111, respectively. For example, the first positive active material layer 102*a* may protrude substantially perpendicular to a surface of the positive electrode current collector layer 101, and the first negative active material layer 112*a* may protrude substantially perpendicular to a surface of the negative electrode current collector 111. However, the first positive active material layer 102*a* and the first negative active material layer 112*a* may not be exactly perpendicular to the positive electrode current collector layer 101 and the negative electrode current collector layer 111, respectively, and may be instead disposed in an inclined manner thereto. In addition, the plurality of first positive active material layers 102*a* and the plurality of first negative active material layers 112*a* may alternately be disposed in flat planar form. That is, between the positive electrode current collector layer 101 and the negative electrode current collector layer 111, the plurality of first positive active material layers 102*a* and the plurality of first negative active material layers 112*a* may be disposed substantially perpendicular or perpendicular to a surface of the positive electrode current collector layer 101 and that of the negative electrode current collector layer 111, respectively, and the plurality of first positive active material layers 102*a* and the plurality of first negative active material layers 112*a* may alternately be disposed along a direction which is substantially parallel or parallel to surfaces of the positive electrode current collector layer 101 and the negative electrode current collector layer 111, respectively.

The first positive active material layer 102*a* and the first negative active material layer 112*a* may be in planar form and may be perpendicular to the current collector layer 101 and the negative electrode current collector layer 111. When the first positive active material layer 102*a* and the first negative active material layer 112*a* are in planar form, the migrating distance for ions present within the first positive active material layer 102*a* and/or the first negative active material layer 112*a* to reach the electrolyte layer 120 may decrease, thus reducing internal resistance and improving high-rate characteristics.

The thicknesses of the first positive active material layer 102*a* and the first negative active material layer 112*a* may each be, independently, about 100 µm or less. For example, the thicknesses of the first positive active material layer 102*a* and the first negative active material layer 112*a* may each be 50 µm or less. For example, the thicknesses of the first positive active material layer 102*a* and the first negative active material layer 112*a* may each be 40 µm or less. For example, the thicknesses of the first positive active material layer 102*a* and the first negative active material layer 112*a* may each be 30 µm or less. For example, the thicknesses of the first positive active material layer 102*a* and the first negative active material layer 112*a* may each be 20 µm or less. For example, the thicknesses of the first positive active material layer 102*a* and the first negative active material layer 112*a* may each be 10 µm or less. For example, the thicknesses of the first positive active material layer 102*a* and the first negative active material layer 112*a* may each be about 5 µm or less. For example, the thicknesses of the first positive active material layer 102*a* and the first negative active material layer 112*a* may each be from about 0.01 µm to about 100 µm. As the thicknesses of the first positive active material layer 102*a* and the first negative active material layer 112*a* decrease, the migrating distance for ions present within the first positive active material layer 102*a* and/or the first negative active material layer 112*a* to reach the electrolyte layer 120 may decrease, thus reducing internal resistance and improving high-rate characteristics.

The thickness of the electrolyte layer 120 may be 20 µm or less. For example, the thickness of the electrolyte layer 120 may be 15 µm or less. For example, the thickness of the electrolyte layer 120 may be 10 µm or less. For example, the thickness of the electrolyte layer 120 may be 5 µm or less. For example, the thickness of the electrolyte layer 120 may be 4 µm or less. For example, the thickness of the electrolyte layer 120 may be 2 µm or less. For example, the thickness of the electrolyte layer 120 may be 1 µm or less. For example, the thickness of the electrolyte layer 120 may be 0.5 µm or less. For example, the thickness of the electrolyte layer 120 may be 0.1 µm or less. For example, the thickness of the electrolyte layer 120 may be from about 0.01 µm to about 20 µm. As the thickness of the electrolyte layer 120 decreases, the migrating distance for ions from the first positive active material layer 102*a* to reach the first negative active material layer 112*a* may decrease, thus reducing internal resistance and improving high-rate characteristics.

The thicknesses of the positive electrode current collector layer 101 and the negative electrode current collector layer 111 may each be about 30 µm or less. For example, the thicknesses of the positive electrode current collector layer 101 and the negative electrode current collector layer 111 may each be about 20 µm or less. For example, the thicknesses of the positive electrode current collector layer 101 and the negative electrode current collector layer 111 may each be about 10 µm or less. For example, the thicknesses of the positive electrode current collector layer 101 and the negative electrode current collector layer 111 may each be about 5 µm or less. For example, the thicknesses of the positive electrode current collector layer 101 and the negative electrode current collector layer 111 may each be about 3 µm or less. For example, the thicknesses of the positive electrode current collector layer 101 and the negative electrode current collector layer 111 may each be from about 0.01 µm to about 30 µm. As the thicknesses of the positive electrode current collector layer 101 and the negative electrode current collector layer 111 decrease, the weight fraction of the current collectors in the battery module 100 decrease. Thus, energy density per unit weight of the battery module 100 may increase.

Figure 7:
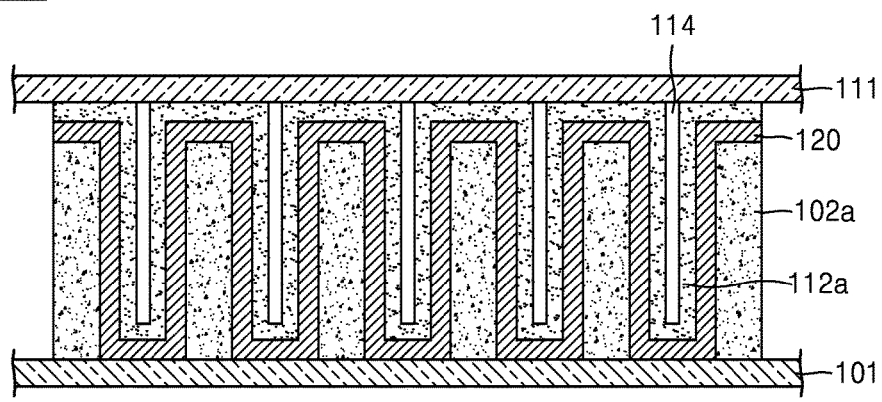
FIG. 7 illustrates a cross-sectional view of still yet another embodiment of a battery module.

Referring to FIG. 7, the battery module 100 may include a buffer layer 114 that may be in contact with the negative electrode current collector layer 111 and protrude therefrom into the inside of the plurality of first negative active material layers 112*a*. When charging and discharging the battery module 100, the buffer layer 114 may withstand volume changes of the first negative active material layer 112*a*, consequently leading to prevention of deterioration, such as cracking, of the first negative active material layer 112*a*. The buffer layer 114 may include an elastic member that may capable of easily changing its volume in response to an external force. The elastic member may be, for example, at least one selected from a gas, a natural rubber, and a synthetic rubber. When the elastic member is a gas, embodiments may be illustrated differently, e.g., the buffer layer 114 may be hollow. The gas may be the same as the previously-described ion non-conductive gas. Examples of the synthetic rubber may include styrene-butadiene rubber (SBR), butadiene rubber (BR), isoprene rubber (IR), ethylene-propylene diene monomer (EPDM) rubber, silicon rubber, an alkyl acrylate copolymer, styrene-butadiene copolymer, styrene-ethylene-butadiene-styrene copolymer, a polymethyl silane rubber, and butyl acrylate copolymer, but embodiments are not limited thereto. Any suitable synthetic rubber available in the art may be used as an elastic member. The elastic member may further include a conductive agent. The conductive agent may be a carbonaceous conductive agent and/or a metallic conductive agent, but is not particularly limited thereto. Non-limiting examples of the conductive agent may include at least one selected from carbon black, graphite particulates, natural graphite, artificial graphite, acetylene black, Ketjen black, carbon fibers, carbon nanotubes, metallic materials, such as copper, nickel, aluminum, or silver, in powder, fiber, or tube form, and a conductive polymer, such as a polyphenylene derivative. Any suitable conductive agent available may be used.

Referring to FIGS. 3 and 4, in the battery module 100 included in the battery structure 200, the electrolyte layer 120 may be folded several times along a portion (e.g., an interface) between the plurality of first positive active material layers 102*a* and the plurality of first negative active material layers 112*a*. Therefore, the first positive active material layer 102*a* and the first negative active material layer 112*a* may not be in direct contact with each other, however, the first positive active material layer 102*a* and the first negative active material layer 112*a* may be capable of exchanging metal ions with each other through the electrolyte layer 120. The metal ions that the electrolyte layer 120 transfers may be lithium ions or sodium ions. In addition, the positive electrode current collector layer 101 may be electrically connected only to the first positive active material layer 102*a*, and the negative electrode current collector layer 111 may be electrically connected only to the first negative active material layer 112*a*.

Referring to FIGS. 3, 4, and 5, in the battery structure 200, the electrolyte layer 120 may be in contact with at least one of the positive electrode current collector layer 101 and the negative electrode current collector layer 111. The electrolyte layer 120 may be folded several times along a portion (e.g. an interface) between the plurality of first positive active material layers 102*a* and the plurality of first negative active material layers 112*a* such that the electrolyte layer 120 may be in contact with at least one of the positive electrode current collector layer 101 and the negative electrode current collector layer 111. For example, referring to FIG. 4, the electrolyte layer 120 may be bent several times along a portion between the plurality of first positive active material layers 102*a* and the plurality of first negative active material layers 112*a* such that the electrolyte layer 120 may be in contact with both the positive electrode current collector layer 101 and the negative electrode current collector layer 111. For example, referring to FIG. 5, the electrolyte layer 120 may be folded several times along a portion between the plurality of first positive active material layers 102*a* and the plurality of first negative active material layers 112*a* such that the electrolyte layer 120 may be in contact with the positive electrode current collector layer 101 but may not be in contact with the negative electrode current collector layer 111.

Referring to FIG. 6, the electrolyte layer 120 may be folded several times along a portion between the plurality of positive active material layers 102 and the plurality of negative active material layers 112 such that the electrolyte layer 120 may not be in contact with either the positive electrode current collector layer 101 or the negative electrode current collector layer 111.

Referring to FIG. 4, the battery module 100 included in the battery structure 200 may include a positive conductor layer 105 that may be in contact with the positive electrode current collector layer 101 and inserted into the inside of each of the plurality of first positive active material layers 102. The battery module 100 included in the battery structure 200 may include a negative electrode conductive layer 115 that may be in contact with the negative electrode current collector layer 111 and inserted into the inside of each of the plurality of first negative active material layers 112.

The positive conductor layer 105 and the positive electrode current collector layer 101 may be prepared using different materials, and then adhered to each other. Also, the positive conductor layer 105 and the positive electrode current collector layer 101 may be prepared as a single unit using the same electrically conductive material. The negative electrode conductive layer 115 and the negative electrode current collector layer 111 may be prepared using different materials, and then adhered to each other. Also, the positive conductor layer 105 and the positive electrode current collector layer 101 may be prepared as one body using the same electrically conductive material. For example, the positive electrode current collector layer 101 may have a plurality of positive conductor layers 105 extending in a substantially perpendicular or perpendicular direction from a surface thereof. The negative electrode current collector layer 111 may have a plurality of negative electrode conductive layers 115 extending in a substantially perpendicular or perpendicular direction from a surface thereof. In FIG. 4, the positive conductor layer 105 and the negative electrode conductive layer 115 are illustrated in flat planar form; however, they may not be in planar form but may be in any form suitable as a conductive layer, such as fishbone form, mesh form, or lattice form.

Since the positive conductor layer 105 in planar form is inserted into the first positive active material layer 102*a*, both sides of the positive conductor layer 105 may be in contact with the first positive active material layer 102*a*. Since the negative electrode conductive layer 115 in planar form is inserted into the first negative active material layer 112*a*, both sides of the negative electrode conductive layer 115 may be in contact with the first negative active material layer 112a. The positive conductor layer 105 and the negative electrode conductive layer 115 may extend from the positive electrode current collector layer 101 and the negative electrode current collector layer 111, respectively, to be in contact with the electrolyte layer 120. The positive conductor layer 105 and the negative electrode conductive layer 115 each extend to the electrolyte layer 120, thereby facilitating migration of electrons to end portions of the first positive active material layer 102a and the first negative active material layer 112a. In some embodiments, the positive conductor layer 105 and the negative electrode conductive layer 115 may extend from the positive electrode current collector layer 101 and the negative electrode current collector layer 111, respectively, toward the electrolyte layer 120, but may not make contact with the electrolyte layer 120. In FIG. 4, it is illustrated that the positive conductor layer 105 and the negative electrode conductive layer 115 are each inserted into all each of the first positive active material layers 102a and each the first negative active material layers 112a, respectively. However, the positive conductor layer 105 and the negative electrode conductive layer 115 may optionally be inserted into only some of the plurality of first positive active material layers 102a and the of the plurality of first negative active material layers 112a, respectively, and the inserted positive conductor layer 105 and the inserted negative electrode conductive layer 115 may be in different forms. In addition, in FIG. 4, it is illustrated that all of the positive conductor layers 105 and the negative conductor layers 115 extend from the positive electrode current collector layer 101 and the negative electrode current collector layer 111 to the electrolyte layer 120 in order to contact the electrolyte layer 120, respectively. However, only some of the plurality of positive electrode conductive layers 105 and the negative conductor layers 115 may contact the electrolyte layer 120 while the rest may not be in contact with the electrolyte layer 120. Furthermore, when at least one selected from the first positive active material layer 102a and the first negative active material layer 112a has high electronic conductivity, the positive electrode conductive layer 105 and the negative conductor layer 115 may be omitted. For example, when the first negative active material layer 112a is lithium metal, the negative conductor layer 115 may be omitted, due to the high electronic conductivity of lithium metal.

The thicknesses of the positive electrode conductive layer 105 and the negative conductor layer 115 may each be about 3 μm μm or less. For example, the thicknesses of the positive electrode conductive layer 105 and the negative conductor layer 115 may each be about 2 μm or less. For example, the thicknesses of the positive conductor layer 105 and the negative conductor layer 115 may each be about 1 μm or less. For example, the thicknesses of the positive conductor layer 105 and the negative conductor layer 115 may each be about 0.5 μm or less. For example, the thicknesses of the positive conductor layer 105 and the negative conductor layer 115 may each be about 0.3 μm or less. For example, the thicknesses of the positive conductor layer 105 and the negative conductor layer 115 may each be from about 0.1 μm to about 3 μm. As the thicknesses of the positive conductor layer 105 and the negative conductor layer 115 decrease, the weight fraction of the current collectors comprising the conductor layers in the battery module 100 decreases. Thus, energy density per unit weight of the battery module 100 may increase.

Deterioration of the battery module 100 may result from a rapid decrease in the resistance, as well as an increase in the resistance. That is, excess current may flow in a module, consequently leading to consumption of energy. When one battery module 100 in the battery structure 200 has failed, which may cause an increase of current loss due to a rapid decrease of resistance, each battery module 100 may include a separate device or material that may insulate the failed battery module 100 from other battery modules 100. In the battery structure 200, when each of the battery modules 100 includes the separate device or material, current loss due to a rapid decrease in resistance of the battery module 100 may be prevented. Types of the device are not particularly limited, and the device may be any suitable material and/or device capable of electrically blocking the battery module 100 from the surrounding environment when the resistance of the battery module 100 exceeds a certain level. The material and/or device may be disposed in the battery module 100, attached to the battery module 100, and/or disposed around the battery module 100.

In the battery structure 200 according to the above-described embodiments, the battery module 100 may include the plurality of parallel first positive active material layers 102a and the plurality of parallel first negative active material layers 112a on the positive electrode current collector layer 101 and the negative electrode current collector layer 111 that are parallel to each other, respectively. The plurality of parallel first positive active material layers 102a and the plurality of parallel first negative active material layers 112a may alternately be disposed on surfaces of the positive electrode current collector layer 101 and the negative electrode current collector layer 111, consequently leading to improvements in the energy density and high-rate characteristics of the battery module 100. In some embodiments, referring to FIG. 3, when the heights of the first positive active material layer 102a and the first negative active material layer 112a increase, thereby increasing the height H of the battery module 100, high-rate characteristics may improve due to an increase in the total reaction surface area in proportion to the increase in height H. In addition, when the height H of the battery module 100 increases, the volume fraction of the first positive active material layer 102a and the first negative active material layer 112a in the battery module 100 may also increase, thus improving energy density of the battery module 100. Consequently, the charging time may decrease in company with an increase in the operating time of the battery module 100. In addition, when the battery module 100 includes a solid electrolyte as the electrolyte layer 120, the battery module 100 may not encounter problems, such as leakage or ignition of an electrolytic solution, thus improving the stability thereof. The battery module 100 may be manufactured in small sizes, and thus, the battery structure 200 including the battery module 100 may easily be used in batteries of small devices, such as mobile devices or wearable devices. The battery structure 200 may be, for example, used in cell phones, glasses, healthcare bands, or wrist watches.

The battery structure 200 including the foregoing battery module 100 may be a lithium battery.

In lithium batteries, the positive active material included in the positive active material layer 102 is not particularly limited, and any suitable lithium battery positive active material may be used.

A positive active material may be a compound capable of reversible intercalation and deintercalation of lithium (i.e., a lithiated intercalation compound). The positive active material may include at least one selected from lithium cobalt oxide, lithium nickel cobalt manganese oxide, lithium nickel cobalt aluminum oxide, lithium iron phosphorous oxide, and lithium manganese oxide. The positive active material is not limited to these examples, and any suitable positive active material may be used For example, the positive active material may be at least one selected from a lithium cobalt oxide such as $LiCoO_2$; a lithium nickel oxide such as $LiNiO_2$; a lithium manganese oxide such as $Li_{1+x}Mn_{2-x}O_4$ (wherein x is from 0 to 0.33); a lithium manganese oxide such as $LiMnO_3$, $LiMn_2O_3$, or $LiMnO_2$; a lithium copper oxide such as $Li_2CuO_2$; a lithium iron oxide such as $LiFe_3O_4$; a lithium vanadium oxide such as $LiV_3O_8$; a copper vanadium oxide such as $Cu_2V_2O_7$; a vanadium oxide such as $V_2O_5$; a lithium nickel oxide such as $LiNi_{1-x}M_xO_2$ (wherein M is at least one selected from Co, Mn, Al, Cu, Fe, Mg, B, and Ga, and x is from 0.01 to 0.3); a lithium manganese composite oxide such as $LiMn_{2-x}M_xO_2$ (wherein M is at least one selected from Co, Ni, Fe, Cr, Zn, and Ta, and x is from 0.01 to 0.1) or $Li_2Mn_3MO_8$ (wherein M is at least one selected from Fe, Co, Ni, Cu, and Zn); a lithium manganese oxide ($LiMn_2O_4$) with partial substitution of lithium by alkali earth metal ions; a disulfide compound; and an iron molybdenum oxide represented by $Fe_2(MoO_4)_3$. For example, the positive active material may be at least one selected from $LiCoO_2$, $LiNiO_2$, $LiMn_2O_4$, and $LiFePO_4$.

In lithium batteries, the negative active material included in the negative active material layer 112 is not particularly limited, and any suitable lithium battery negative active material may be used.

The negative active material may be at least one selected from an alkali metal (e.g., lithium, sodium, or potassium), an alkaline earth-metal (e.g., calcium, magnesium, or barium), a certain transition metal (e.g., zinc), and an alloy thereof. In particular, the negative active material may be at least one selected from lithium and a lithium alloy.

Lithium metal may be used as a negative active material. When lithium metal is used as a negative active material, a current collector may be omitted. Therefore, the volume and weight occupied by the current collectors may decrease, and thus, energy density per unit weight of the battery structure 200 may be improved.

An alloy of lithium metal and another negative active material may be used as a negative active material. The other negative active material may be a metal alloyable with lithium. Examples of the metal alloyable with lithium may include at least one selected from Si, Sn, Al, Ge, Pb, Bi, Sb, a Si—Y alloy (where Y is at least one selected from an alkali metal, an alkaline earth-metal, a Group 13 element, a Group 14 element, a transition metal, and a rare-earth element, and Y is not Si), and a Sn—Y alloy (where Y is at least one selected from an alkali metal, an alkaline earth-metal, a Group 13 element, a Group 14 element, a transition metal, and a rare-earth element, and Y is not Sn). Y may be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po. For example, the lithium alloy may be at least one selected from a lithium aluminum alloy, a lithium silicon alloy, a lithium tin alloy, a lithium silver alloy, and a lithium lead alloy.

In lithium batteries, the solid electrolyte included in the electrolyte layer 102 is not particularly limited, and any suitable solid electrolyte may be used.

The solid electrolyte may be at least one selected from $BaTiO_3$, $Pb(Zr,Ti)O_3$ ("PZT"), $Pb_{1-x}La_xZr_{1-y}Ti_yO_3$ ("PLZT") (wherein 0≤x<1 and 0≤y<1), $PB(Mg_3Nb_{2/3})O_3$—$PbTiO_3$ ("PMN-PT"), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein 0<x<2, and 0<y<3), lithium aluminum titanium phosphate ($Li_xAl_yTi_z(PO_4)_3$, wherein 0<x<2, 0<y<1, and 0<z<3), $Li_{1+x+y}(Al, Ga)_x(Ti, Ge)_{2-x}Si_yP_{3-y}O_{12}$ (wherein 0≤x≤1 and 0≤y≤1), lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), lithium nitrate ($Li_xN_y$, wherein 0<x<4 and 0<y<2), lithium phosphate oxynitrate (LiPON, $Li_xPON_y$, wherein 0<x<4 and 0<y<2), $SiS_2$ type glass ($Li_xSi_yS_z$, wherein 0<x<3, 0<y<2, and 0<z<4), $P_2S_5$ type glass ($Li_xP_yS_z$, wherein 0<x<3, 0<y<3, and 0<z<7), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, garnet-based ceramic, and $Li_{3+x}La_3M_2O_{12}$ (wherein M=Te, Nb, or Zr) f, but embodiments are not limited thereto. Any suitable solid electrolyte may be used. In some embodiments, the solid electrolyte may be LiPON.

According to one or more embodiments, a method of manufacturing the battery structure 200 may include preparing a positive active material layer module 106; disposing the plurality of positive active material layer modules 106 on a positive electrode current collector layer 101 so as to be spaced apart from one another; disposing an electrolyte layer 120 on the plurality of positive active material layer modules 106; disposing a negative active material layer 112 on the electrolyte layer 120; and disposing a negative electrode current collector layer 111 on the negative active material layer 112, wherein the positive active material layer module 106 may include a plurality of positive active material layers 102 disposed perpendicular to a surface of the positive electrode current collector layer 101.

Figure 8A:
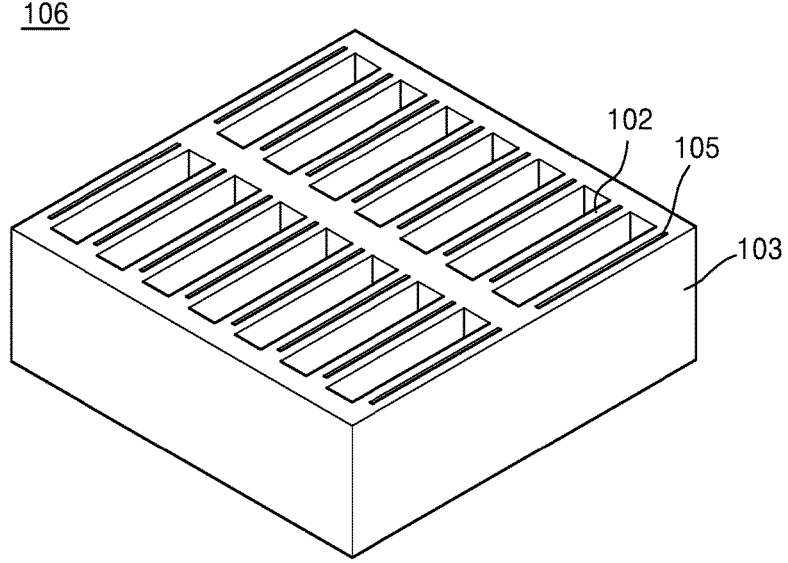
FIG. 8A illustrates a perspective view showing a step in a method of manufacturing a battery structure.
Figure 8B:
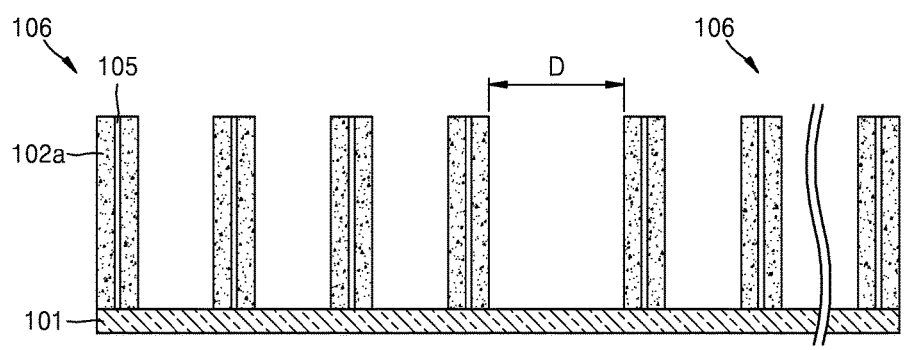
FIGS. 8B to 8E illustrate cross-sectional views showing additional steps in the method of manufacturing a battery structure.
Figure 8C:
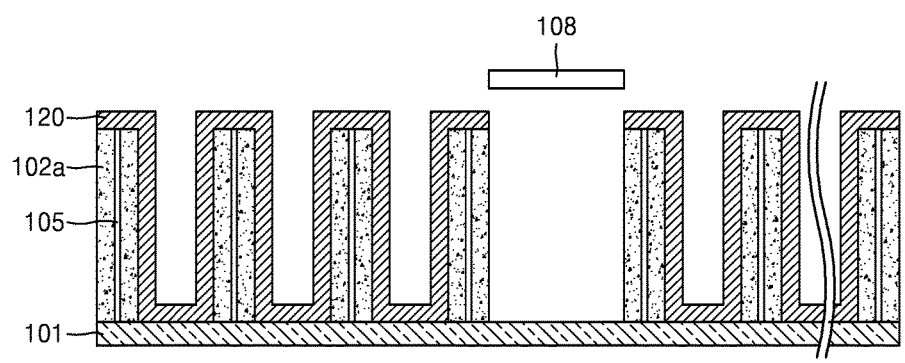

The method of manufacturing the battery structure 200 will be described with reference to FIGS. 8A to 8E. Referring to FIG. 8A, first, the positive active material layer module 106 may be prepared. Referring to FIG. 8B, the plurality of positive active material layer modules 106 may be disposed on the positive electrode current collector layer 101 to be spaced apart by a certain distance D from one another. Since FIG. 8B is a cross-sectional view, some portions are omitted. Although the plurality of positive active material layer modules 106 are not illustrated in the drawings, the plurality of positive active material layer modules 106 may be attached to the positive electrode current collector layer 101 using a conductive adhesive and/or a conductive paste. Referring to FIG. 8C, the electrolyte layer 120 may be disposed on the positive active material layer module 106. The electrolyte layer 120 may be disposed by deposition, but embodiments are not limited thereto. Any suitable method capable of disposing the electrolyte layer on the positive active material layer module may be used. For example, the method of depositing the electrolyte layer 120 may include chemical vapor deposition (CVD) or physical vapor deposition (PVD). The electrolyte layer 120 may be LiPON, but embodiments are not limited thereto. Any solid electrolyte suitable as the electrolyte layer 120 may be used.

Figure 8D:
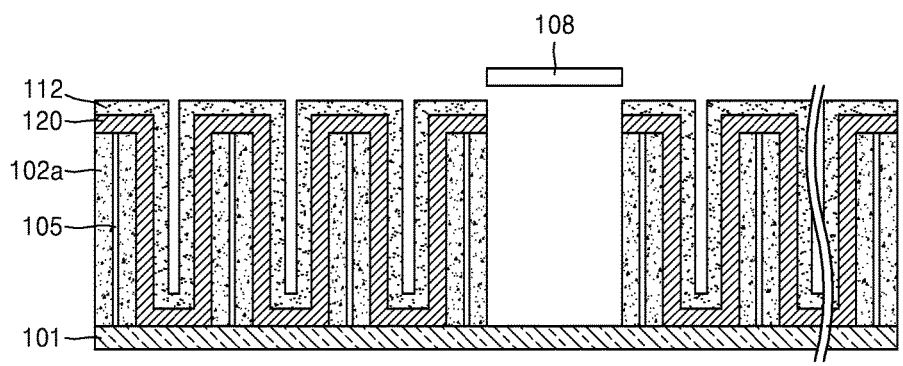
Figure 8E:
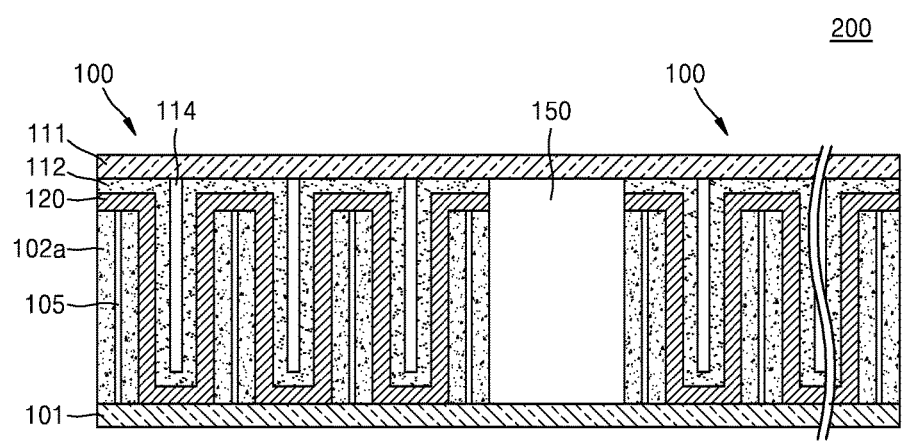

In order to prevent ions from migrating, an electrolyte layer may not be disposed between the separated positive active material layer modules 106. Referring to FIGS. 8C and 8D, by using a mask 108, the electrolyte layer 120 and the negative active material layer 112 may not be disposed on a portion between the separated positive active material layer modules 106. Referring to FIG. 8D, the negative active material layer 112 may be disposed on the electrolyte layer 120. The negative active material layer 112 may be disposed by deposition, but embodiments are not limited thereto. Any suitable method capable of disposing the negative active material layer 112 may be used. For example, the method of depositing the negative active material layer 112 may include thermal evaporation. The negative active material layer 112 may be Li metal, but embodiments are not limited thereto. Any suitable negative active material may be used as the negative active material layer 112. Referring to FIG. 8E, the negative electrode current collector layer 111 may be disposed on the negative active material layer 112, thereby preparing the battery structure 200. When the negative electrode current collector layer 111 is disposed on the negative active material layer 112, and pressure is applied thereto by a compression jig, contact resistance between the negative active material layer 112 and the negative electrode current collector layer 111 may decrease. Referring to FIG. 8E, a buffer layer 114 that may contact the negative electrode current collector 111 may be included in the negative active material layer 112. The buffer layer 114 may readily withstand volume changes of the negative active material layer 112 during charging and discharging of the battery module 100. Referring to FIGS. 8C, 8D, and 8E, the buffer layer 114 may be a space formed by not completely filling the negative active material layer 112 into a trench formed by a fold of the electrolyte layer 120. The battery structure 200 may include the plurality of battery modules 100 that are spaced apart from each other, and an ion non-conductive layer 150 may also be disposed between the plurality of battery modules 100. Thus, the plurality of battery modules 100 may be ionically blocked from one another.

In some embodiments, although not illustrated in the drawings, a method of manufacturing the battery structure 200 according to one or more embodiments includes preparing the positive active material layer module 106; disposing the positive active material layer module 106 on a conductive substrate; disposing the electrolyte layer 120 on the positive active material layer module 106; disposing the negative active material layer 112 on the electrolyte layer 120 to prepare the battery module 100; disposing a plurality of the battery modules 100 on the positive electrode current collector layer 101 so as to be spaced apart from one another; and disposing the negative electrode current collector layer 111 on the plurality of battery modules 100, wherein the positive active material layer module 106 may include the plurality of positive active material layers 102 disposed perpendicular to a surface of the positive electrode current collector layer 101. In other words, each of the battery modules 100 may be separately manufactured, the manufactured battery modules 100 may be disposed on the positive electrode current collector layer 101 so that the battery modules are spaced apart from each other, and then the negative electrode current collector layer 111 may be disposed on the manufactured battery modules 100.

In this case, each of the conductive substrates disposed on a surface of the plurality of positive active material layer modules 106 may be attached to one positive electrode current collector layer 101 using a conductive adhesive and/or a conductive paste.

Figure 9A:
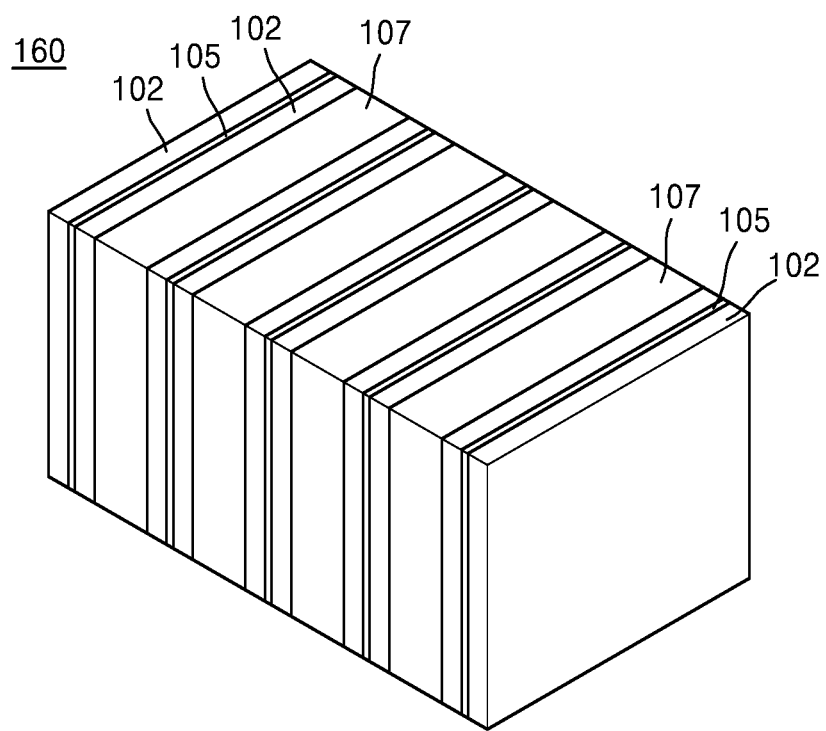
FIGS. 9A to 9E illustrate perspective views showing a method of manufacturing a positive active material layer module.
Figure 9B:
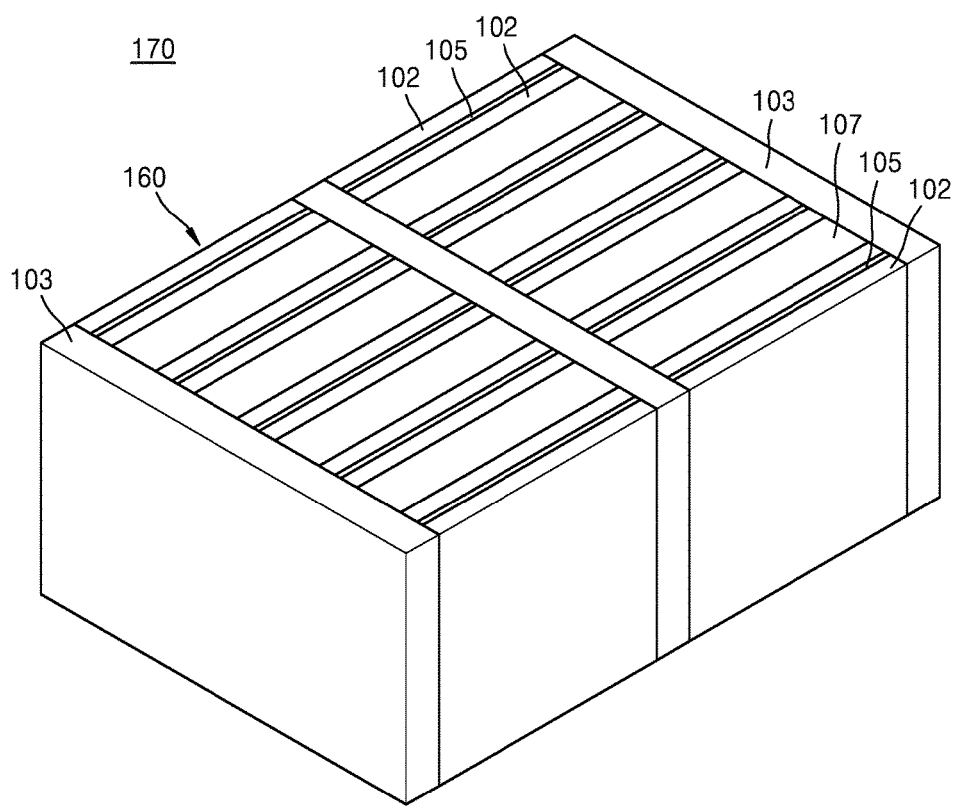
Figure 9C:
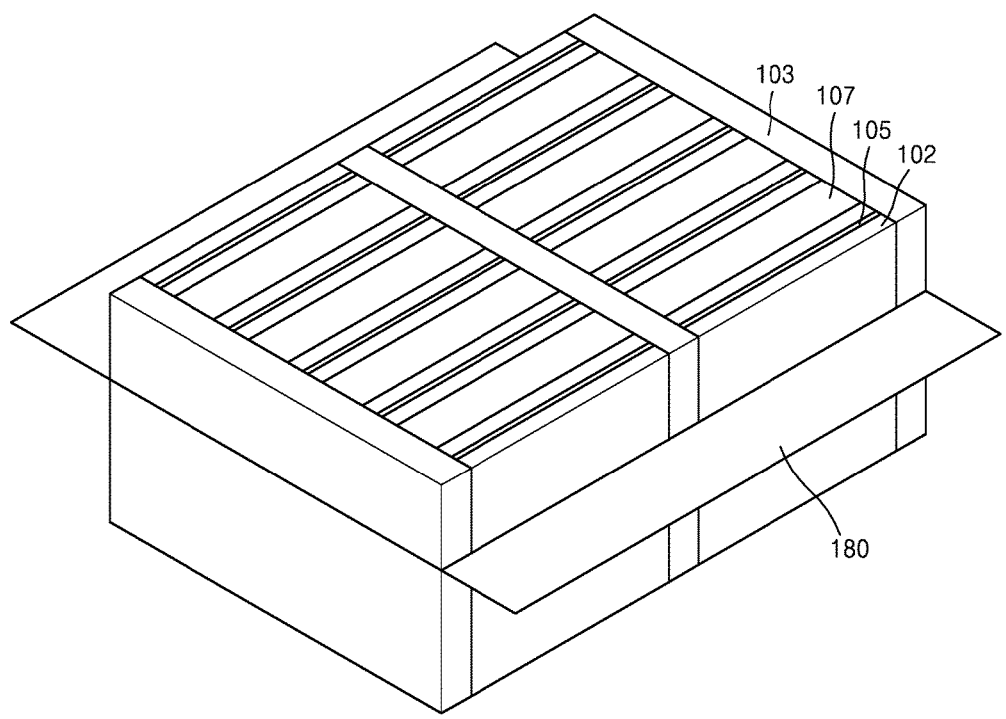
Figure 9D:
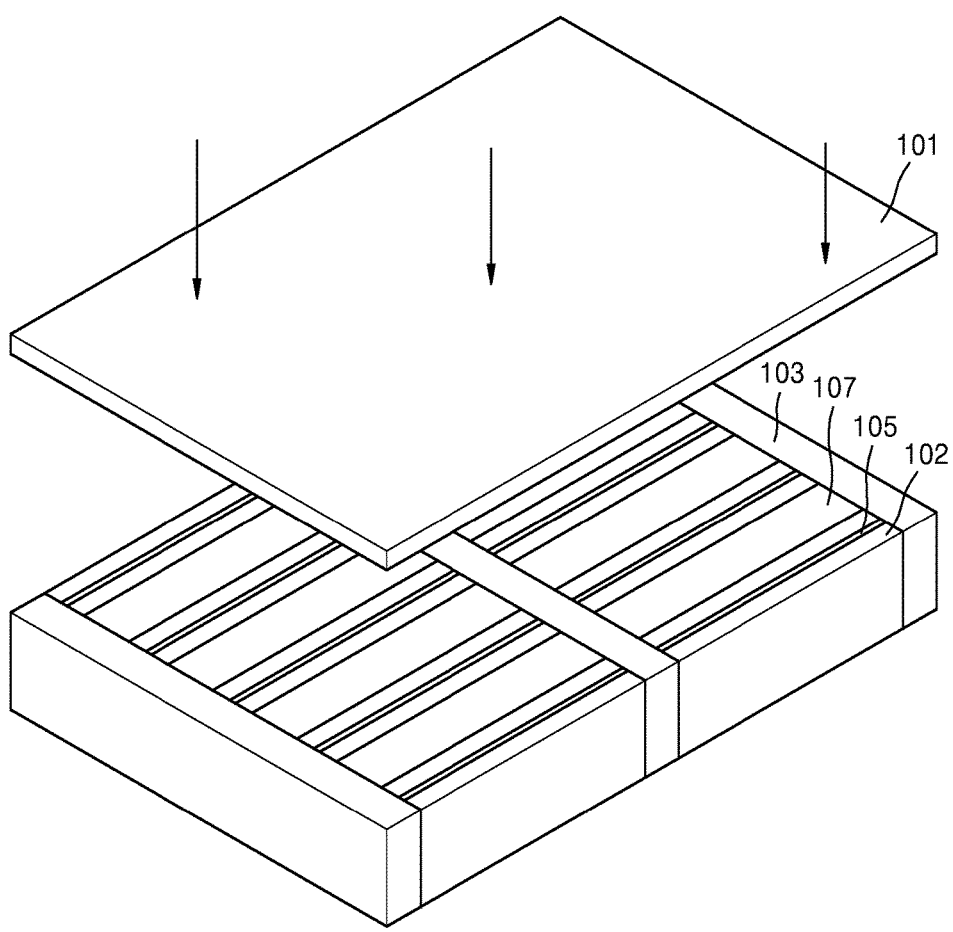
Figure 9E:
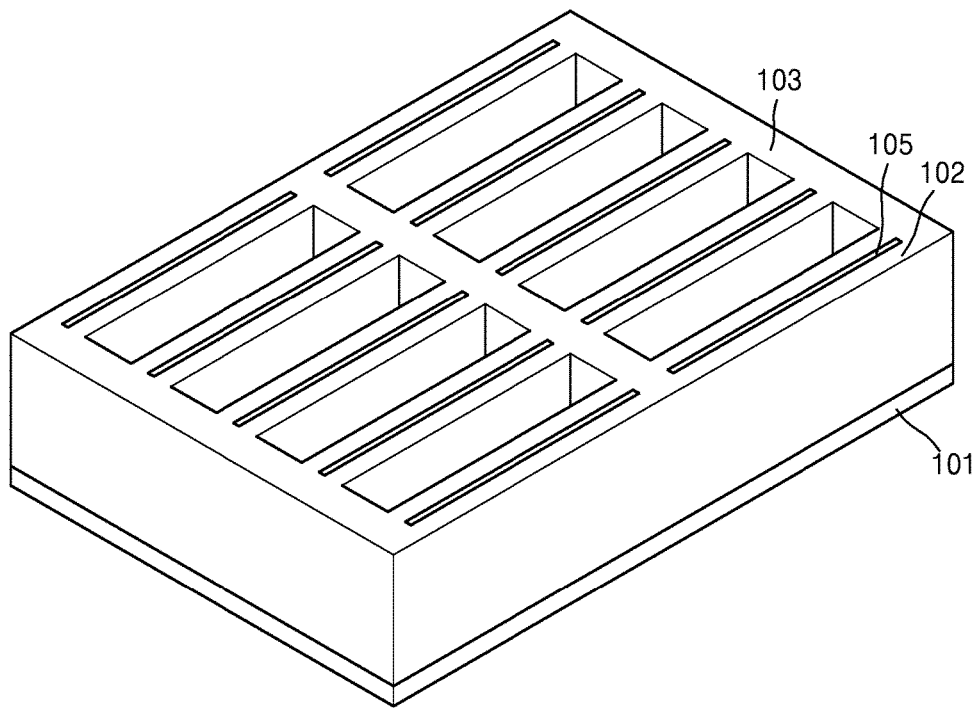

Referring to FIGS. 9A, 9B, and 9E, preparation of the positive active material layer module 106 may include sequentially stacking in this stated order the positive active material layer 102, the positive conductor layer 105, the positive active material layer 102, and a sacrificial layer 107 several times to prepare a first stacked structure 160; preparing a second stacked structure 170 by sequentially stacking in this stated order the first stacked structure 160 and a partition 103 disposed parallel to a stacking direction (i.e., thickness direction) of the first stacked structure 160 several times; and sintering the second stacked structure 170 to remove the sacrificial layer 107 to prepare the positive active material layer module 106.

The method of preparing the positive active material layer module 106 will be described with reference to FIGS. 9A to 9E. First, a positive active material powder may be mixed and/or milled with a binder, a plasticizer, and a solvent to prepare a positive active material layer slurry. A sacrificial layer powder may be mixed and/or milled with a binder, a plasticizer, and a solvent to prepare a sacrificial layer slurry. A partition member powder may be mixed and/or milled with a binder, a plasticizer, and a solvent to prepare a partition slurry. The foregoing slurries may each be cast on substrates by a tape casting method, followed by drying to prepare a thick film tape. Due to the foregoing drying step, a solvent present in each slurry may evaporate, leaving a tape in which raw powder is bound together by a binder. Therefore, a positive active material layer tape, a sacrificial layer tape, and a partition tape may be prepared in the same manner. Referring to FIG. 9A, the positive active material layer 102 tape, the positive conductor layer 105 tape, the positive active material layer 102 tape, and the sacrificial layer 107 tape may sequentially be laminated in this stated order several times, and then, a pressure may be applied thereto at a temperature around the glass transition temperature (Tg) of the binder to prepare the first stacked structure 160, in which the foregoing layer tapes are bound to one another. The method of disposing the positive conductor layer 105 is not particularly limited, and methods, such as printing a slurry or paste that includes an electrically conductive material, sputtering an electrical conductivity material, or PVD, such as by evaporation, may be used. Referring to FIG. 9B, the first stacked structure 160 and a partition 103 disposed parallel to a lamination direction (i.e. thickness direction) of the first stacked structure 160 may sequentially be laminated several times, and then a pressure may be applied thereto at around the glass transition temperature (Tg) of the binder to prepare a second stacked structure 170 in which the first stacked structure 160 and the partition 103 are bound to each other. The first stacked structure 160 may be processed to have a proper size depending on a desired gap between partitions 103, before lamination of the first stacked structure 160 and the partition 103. The partitions 103 may be arranged with constant spacing along a longitudinal direction of the positive active material layer 102 such that the partitions 103 may support the plurality of positive active material layers 102. Thus, the plurality of positive active material layers 102 having a high aspect ratio, may be arranged with uniform spacing without causing deformation such as flexure or collapse. As the plurality of positive active material layers 102 are arranged with uniform spacing, the electrolyte layer 120 and the negative active material layers 112 may also be arranged with uniform spacing, and thus, the uniformity of electrode reactions in the battery module 100 and the structural stability of the battery module 100 may improve, consequently leading to improvement of charging and discharging capacity and lifespan characteristics of the battery module 100 and the battery structure 200 including the battery module 100.

Next, referring to FIG. 9C, by dicing (e.g., cutting) the second stacked structure 170 along a cross-section 180, a desired height of the positive active material layer module 106 may be determined. Referring to FIG. 9D, the positive electrode current collector layer 101 may be disposed on the diced second stacked structure 170. The method of disposing the positive electrode current collector layer 101 is not particularly limited, and methods, such as disposing an electrically conductive foil followed by pressurizing the foil, printing a slurry or paste that includes an electrically conductive material, sputtering an electrically conductive material, or PVD, such as by evaporation, may be used. In some embodiments, once the positive active material layer module 106 is manufactured by thermal treatment, the positive electrode current collector layer 101 may be disposed thereon. Subsequently, referring to FIG. 9E, a first thermal treatment may be performed on the second stacked structure 170 disposed on a surface of the positive electrode current collector layer 101 at a first temperature so as to remove a binder by burn-out, the binder being included in the positive active material layer module 102, the partition 103, and the conductor layer 105 of the second stacked structure 170. Thereafter, a second thermal treatment may be performed at a second temperature, which may be higher than the first temperature, so as to burn-out the sacrificial layer 107, thereby preparing the positive active material layer module 106, which is a sintered body. The temperature and time of the second thermal treatment may be determined based upon on the type of the sacrificial layer. In some embodiments, the second thermal treatment may be performed without carrying out the first thermal treatment, so as to perform the second thermal treatment to remove the binder and the sacrificial layer 107 with a single thermal treatment. In some embodiments, without dicing the second stacked structure 170, a thermal treatment may first be carried out on the second stacked structure 170 to prepare the positive active material layer module 106, and then the dicing may be carried out. A material for the sacrificial layer 107 may be selected from carbonaceous materials, such as graphite and a pyrolytic polymer, but embodiments are not limited thereto. Any suitable material available in the art may be used that may burn-out at the second thermal treatment temperature.

As described above, according to one or more embodiments, since a battery structure includes a plurality of battery modules that are electrically connected to and ionically blocked from one another, deterioration of a battery module may have less influence on the whole battery structure.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A battery structure comprising:
a positive electrode current collector layer;
a plurality of battery modules disposed on the positive electrode current collector layer and spaced apart from one another; and
a negative electrode current collector layer disposed on the plurality of battery modules and disposed opposite to the positive electrode current collector layer,
wherein each battery module of the plurality of battery modules comprises:
a plurality of first positive active material layers which are in electrical contact with the positive electrode current collector layer and disposed in a direction protruding from the positive electrode current collector layer;
a plurality of first negative active material layers which are in electrical contact with the negative electrode current collector layer and disposed in a direction protruding from the negative electrode current collector layer; and
an electrolyte layer disposed between the plurality of first positive active material layers and the plurality of first negative active material layers.

2. The battery structure of claim 1, wherein each battery module of the plurality of battery modules are electrically connected to one another.

3. The battery structure of claim 1, wherein each battery module of the plurality of battery modules are configured to be ionically blocked from one another.

4. The battery structure of claim 1, the battery structure comprising an ion non-conductive gas or an ion non-conductive solid disposed between each battery module of the plurality of battery modules.

5. The battery structure of claim 1, wherein a distance between the plurality of battery modules is in a range of about 0.01 millimeters to about 1 millimeter.

6. The battery structure of claim 1, wherein a distance between a side surface and an opposite side surface of each battery module of the plurality of battery modules is in a range of about 2 millimeters to about 5 centimeters.

7. The battery structure of claim 1, wherein each battery module of the plurality of battery modules further comprises at least one partition in contact with the plurality of first positive active material layers and disposed perpendicular to the plurality of first positive active material layers.

8. The battery structure of claim 7, wherein the at least one partition has a composition different from a composition of the first positive active material layers.

9. The battery structure of claim 7, wherein the at least one partition has a composition the same as a composition of the first positive active material layers.

10. The battery structure of claim 1, wherein each battery module of the plurality of battery modules further comprises a plurality of second negative active material layers which are in contact with the negative electrode current collector layer and disposed between the plurality of first negative active material layers to connect the plurality of first negative active material layers.

11. The battery structure of claim 1, wherein each battery module of the plurality of battery modules further comprises a plurality of second positive active material layers which are in contact with the positive electrode current collector layer and disposed between the plurality of first positive active material layers to connect the plurality of first positive active material layers.

12. The battery structure of claim 1, wherein each battery module of the plurality of battery modules further comprises a conductive adhesive layer disposed between the plurality of first positive active material layers and the positive electrode current collector layer.

13. The battery structure of claim 1, wherein the positive electrode current collector layer and the negative electrode current collector layer are disposed parallel to each other and are spaced apart from each other.

14. The battery structure of claim 1, wherein the plurality of first positive active material layers and the plurality of first negative active material layers are disposed perpendicular to the positive electrode current collector layer and the negative electrode current collector layer, respectively.

15. The battery structure of claim 1, wherein the battery structure further comprises a buffer layer in contact with the negative electrode current collector layer, and protruding from the negative electrode current collector layer into an inside of each of first negative active material layer of the plurality of first negative active material layers.

16. The battery structure of claim 15, wherein the buffer layer comprises at least one elastic member selected from a gas, natural rubber, and synthetic rubber.

17. The battery structure of claim 1, wherein the electrolyte layer is folded a plurality of times along an interface between the plurality of first positive active material layers and the plurality of first negative active material layers.

18. The battery structure of claim 1, wherein the electrolyte layer is in contact with at least one selected from the positive electrode current collector layer and the negative electrode current collector layer.

19. The battery structure of claim 1, wherein the battery structure further comprises a positive electrode conductive layer in electrical contact with the positive electrode current collector layer and inserted into an inside of each first positive active material layer of the plurality of first positive active material layers.

20. The battery structure of claim 1, wherein each battery module of the plurality of battery modules further comprises a device which insulates the battery module from other battery modules.

21. A method of preparing a battery structure comprising:
preparing a positive active material layer module;
disposing a plurality of positive active material layer modules on a positive electrode current collector layer to be spaced apart from one another;
disposing an electrolyte layer on the plurality of positive active material layer modules;
disposing a negative active material layer on the electrolyte layer; and
disposing a negative electrode current collector layer on the negative active material layer,
wherein the positive active material layer module comprises a plurality of positive active material layers disposed perpendicular to a surface of the positive electrode current collector layer.

22. The method of claim 21, wherein the preparing of a positive active material layer module comprises
sequentially stacking in order a positive active material layer, a positive conductor layer, a positive active material layer, and a sacrificial layer a plurality of times to prepare a first stacked structure;
sequentially stacking in order the first stacked structure and a partition disposed parallel to a stacking direction of the first stacked structure a plurality of times to prepare a second stacked structure; and
sintering the second stacked structure to remove the sacrificial layer to prepare the positive active material layer module.

23. A method of preparing a battery structure comprising:
providing a positive active material layer module;
disposing the positive active material layer module on a conductive substrate;
disposing an electrolyte layer on the positive active material layer module;
disposing a negative active material layer on the electrolyte layer to prepare a battery module;
disposing a plurality of the battery modules on a positive electrode current collector layer to be spaced apart from one another; and
disposing a negative electrode current collector layer on the plurality of battery modules,
wherein the positive active material layer module comprises a plurality of positive active material layers disposed perpendicular to a surface of the positive electrode current collector layer.

* * * * *